Sept. 9, 1924.    W. P. HALL    1,507,827
WINDOW SHADE FIXTURE
Filed March 19, 1923
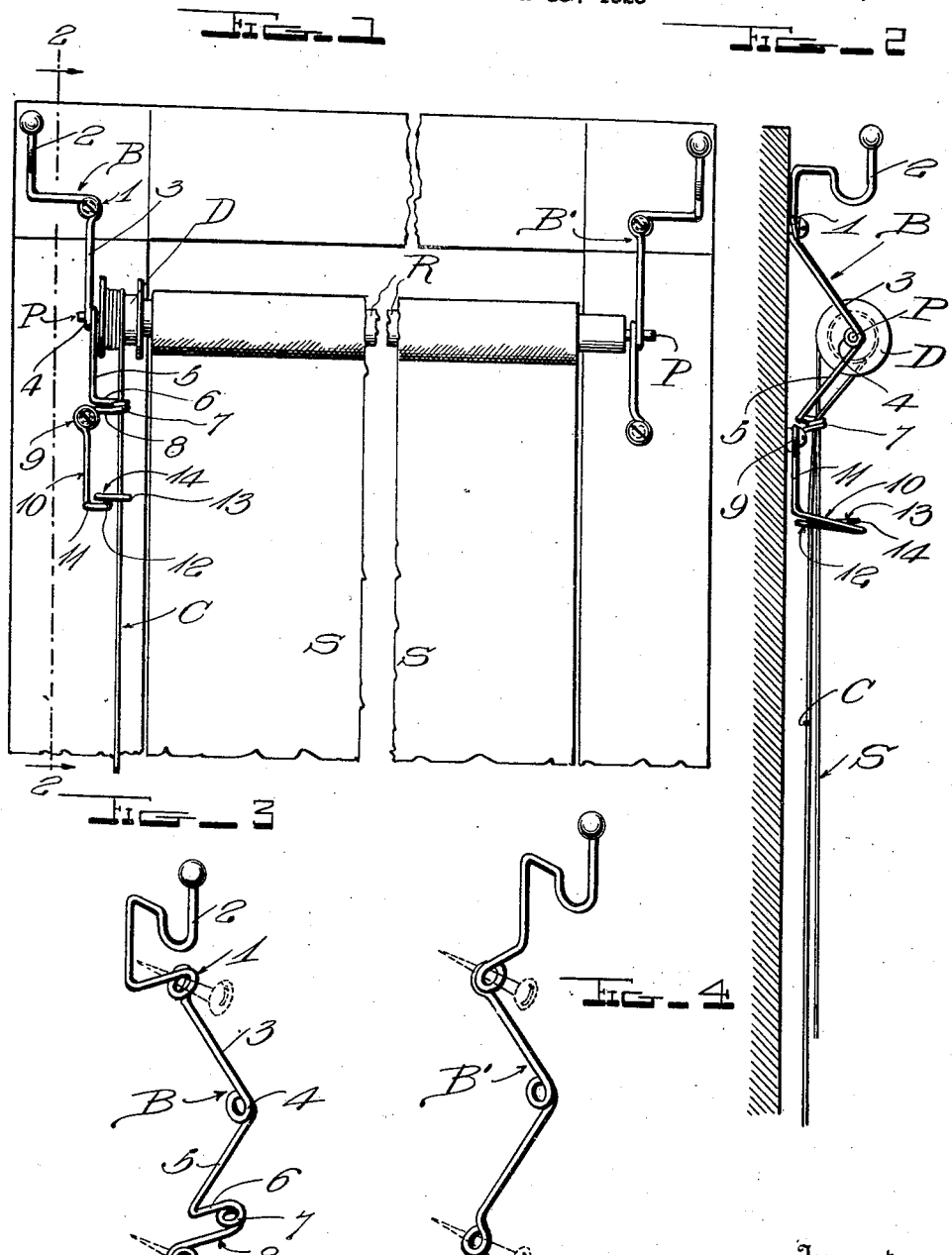
Inventor
William P. Hall
By H. B. Willson &co
Attorneys Patented Sept. 9, 1924.

1,507,827

UNITED STATES PATENT OFFICE.

WILLIAM PENN HALL, OF WORTHVILLE, NORTH CAROLINA, ASSIGNOR OF ONE-HALF TO EDGAR L. YOW, OF WORTHVILLE, NORTH CAROLINA.

WINDOW-SHADE FIXTURE.

Application filed March 19, 1923. Serial No. 626,154.

*To all whom it may concern:*

Be it known that I, WILLIAM PENN HALL, citizen of the United States, residing at Worthville, in the county of Randolph and State of North Carolina, have invented certain new and useful Improvements in Window-Shade Fixtures; and I do declare the following to be a full, clear, and exact description of the invention, such as will enable others skilled in the art to which it appertains to make and use the same.

My invention has for its object to provide a simple and inexpensive window shade fixture for supporting one end of a shade roller which is rotated by means of a cord for the purpose of winding a shade thereon, novel provision being made for guiding the cord and for holding it whenever desired to retain the shade and roller in adjusted position.

With the foregoing in view, the invention resides in the novel subject matter hereinafter described and claimed, the description being supplemented by the accompanying drawing.

Figure 1 is a side elevation of a window frame showing the use of my invention for supporting one end of a shade roller.

Figure 2 is a vertical sectional view as indicated by line 2—2 of Fig. 1.

Figure 3 is a perspective view of the bracket forming the gist of the present invention.

Figure 4 is a perspective view of the bracket employed for supporting the other end of the shade roller.

In the drawings above briefly described, the character B designates the bracket constituting the present invention, while B' indicates another bracket of any desired form for supporting the end of a shade roller opposite the bracket B. I have shown a shade roller R provided with bearing pintles P at its ends and having a drum D at one end around which a cord C is wound in the opposite direction from that in which the shade S is wound upon the roller. Thus, it will be seen that by manipulating the cord C to either raise or lower the same, the roller R will be rotated to raise or lower the shade, as occasion may require.

Both of the brackets B and B' are preferably formed of wire but only the construction of the bracket B will be specifically described, as it is the construction of this bracket upon which the present application is based.

I make use of a single length of wire in forming the bracket B, the upper portion of this wire being bent to form an attaching eye 1 and being suitably shaped above this eye to support a curtain pole, as indicated by the character 2. From the eye 1, the wire declines forwardly as indicated at 3, is coiled to provide a bearing eye 4 for one of the pintles P and then declines rearwardly as indicated at 5. At the lower end of the portion 5, the wire is bent laterally inwardly at 6 and coiled to form a guiding eye 7 for the cord C and from this eye, the wire extends laterally in the opposite direction as indicated at 8, is coiled at 9 to provide a second attaching eye and then extends downwardly as indicated at 10. From the lower end of the portion 10, the wire extends forwardly at 11, then rearwardly at 12 and again forwardly as indicated at 13, the two portions 12 and 13 being disposed in rearwardly converging relation to form a wedge-shaped cord gripping device. After forming this device, the lower extremity of the wire extends horizontally across the front portion thereof to form a guard 14.

The bracket may be attached by nails or screws driven through the eyes 1 and 9 and will serve effectively for supporting one end of the roller R, for guiding the cord C, and for holding this cord in adjusted position. The cord is received between the portions 12 and 13 of the gripping device and is prevented from moving forwardly therefrom, by means of the guard 14. When the cord is pulled forwardly against this guard or in close relation therewith, it may be moved freely to adjust the shade roller, but when said cord is forced rearwardly, it is wedged tightly and held between the portions 12 and 13, to retain the shade in any position to which it has been adjusted.

The bracket B' is preferably of the same general shape as the bracket B, but it is provided with no guide eye such as 7 and with no cord gripping device, as these parts are not necessary at this end of the shade roller.

As excellent results may be obtained from the details disclosed, these details are preferably followed. However, within the scope of the invention as claimed, minor changes may of course be made.

I claim:

1. A window shade bracket formed of a length of wire bent to form a bearing for a roller pintle, the wire being extended downwardly from the bearing and bent to form a cord guide, said wire being extended downwardly from said guide and bent forwardly, backwardly and again forwardly to form an open wedge-shaped cord gripping device, the lower extremity of the wire being bent laterally to form a guard at the front end of said cord gripping device.

2. A window shade bracket formed of a length of wire bent at its upper end portion to form an attaching eye, the wire being declined forwardly from said attaching eye and coiled to form a bearing eye; being then rearwardly declined from said bearing eye, bent laterally and coiled to provide a cord guiding eye; the wire being bent laterally in the other direction from said guiding eye and coiled to provide a second attaching eye; said wire being extended downwardly from said second attaching eye and then bent forwardly, rearwardly, and again forwardly to form a wedge-shaped cord gripping device; the lower extremity of the wire being bent laterally across the front of said gripping device to form a guard to retain the cord therein.

In testimony whereof I have hereunto affixed my signature.

WILLIAM PENN HALL.